United States Patent Office 3,341,516
Patented Sept. 12, 1967

3,341,516
SURFACE - SULFONATED CELLULOSE ETHERS HAVING IMPROVED WATER DISPERSIBILITY
Albert Buckley Savage, Midland, and Julius C. Aldrich, Mount Pleasant, Mich., assignors to The Dow Chemical Company, Midland, Mich., a corporation of Delaware
No Drawing. Filed May 4, 1964, Ser. No. 364,776
5 Claims. (Cl. 260—232)

The present invention relates to the surface sulfonation of particulate water-soluble cellulose ethers to improve their dispersibility and solution properties in water. More particularly, the invention involves carrying out a gas solid reaction of sulfur trioxide with a water-soluble, non-ionic cellulose ether and the product of such a reaction.

When dispersed in water, water-soluble cellulose ethers tend to form agglomerates which are difficultly soluble in water. Heretofore, it has been proposed to treat water-soluble cellulose ethers with glyoxal, or similarly acting materials, whereby the surface of the particulate ether is lightly cross-linked. The initial water resistance imparted to the ether by such cross-linking permits complete wetting of the individual ether particles without the formation of agglomerates. After the surface treated ether has become wet, the cross-linking breaks down permitting the ether particle to dissolve uniformly.

Although the aforementioned surface treatment produces cellulose ether products having excellent dispersibility in water, it would be desirable, and it is an object of the present invention, to provide a novel process for the surface treatment of particulate water-soluble cellulose ethers to improve their dispersibility in water. An additional object of the invention is to provide a surface treatment for particulate cellulose ethers which avoids contacting the cellulose ether with liquid reagents. Small amounts of liquids are difficult to uniformly distribute throughout particulate matter. A still further object is to provide a surface treatment for cellulose ethers which improves the solubility of the ether as well as its water dispersibility.

As employed herein, water dispersibility refers to that property of certain cellulose ethers which renders them amenable to uniform distribution as a solid phase in water. Water solubility is that property of the ethers indicating their amenability to the formation of a solution as evidenced, for example, by the rate of solution viscosity build-up after dispersion of the ethers in water.

These objects, and other benefits as will become apparent hereinafter, are accomplished in the present invention. As a process, this invention comprises passing sulfur trioxide vapor through a dry particulate water-soluble, non-ionic cellulose ether and thereafter passing ammonia through the sulfur trioxide treated ether product to effect neutralization of the sulfonate groups and any entrained sulfur trioxide. The extent of treatment is sufficient to enhance the water dispersibility of the treated ether. Preferably sufficient sulfur trioxide is contacted with the dry ether to produce an average degree of substitution of sulfonate groups within the range from about 0.001 mol/mol up to about 0.1 mol/mol of the cellulose ether. The foregoing mol ratios correspond directly to the degree of substitution of sulfonate groups (sulfonate D.S.), that is, the average number of sulfonate groups per anhydrous glucose residue unit of the treated, particulate cellulose ether mass.

It is critical that the cellulose ether be sufficiently dry to prevent carbonization or charring of the cellulose ether when the same is contacted with the $SO_3$ vapor. Suitable drying of the ether can be effected by any one of several convenient techniques such as blowing hot, dry air through the ether, purging the cellulose ether with dry nitrogen or other inert gas, or simply by heating the cellulose ether at a moderate temperature in the presence of a dry atmosphere, preferably under an atmosphere of reduced pressure. The ether is sufficiently dry when it can be contacted with $SO_3$ vapors without producing carbonization. Generally this means that the ether contains less than about 6 percent by weight free moisture. Free moisture is taken as the weight loss obtained by heating the ether at 80° C. for one hour.

While it is not necessary for the reaction, it is preferred that the cellulose ether be agitated in the presence of sulfur trioxide to quickly effect uniform contacting of individual ether particles with the gas. Subsequent to treating the ether with the sulfur trioxide, sufficient ammonia gas is passed into the reaction mass to effect neutralization of available sulfonate groups and any residual sulfur trioxide that may be entrained in the ether.

The reaction temperature is not critical and may be within broad limits covering the range from about 0° C. up to the caramelization temperature of the ether; however, it is preferred to operate within the temperature range from about 10° C. to about 70° C.

An optional embodiment of the invention which can be carried out whenever difficulties with carbonization or charring of the ether product are encountered involves the aforedescribed procedure, and in addition the pretreatment of the cellulose ether with ammonia gas whereby any moisture present therein is ammoniated. Thus, upon contacting of the ammonia treated ether with the sulfur trioxide, incidental reaction thereof with water incorporated in the cellulose ether merely produces ammonium sulfate instead of the detrimental sulfuric acid.

As is evident from the foregoing procedure, the present invention provides a surface treated cellulose ether having very small amounts of by-product diluents. Moreover, inasmuch as the reaction is carried out between a gas and a solid phase, treatment uniformity is readily achieved. The following examples further illustrate the improved properties of cellulose ethers treated in accordance with the invention. In the examples, particulate, water-soluble cellulose ethers, prepared according to the above-described procedure, are shown to be characterized by both improved water dispersibility and an enhanced solubility as evidenced by the rate of viscosity build-up in the resulting aqueous dispersion.

Example 1

Thirty grams of a water-soluble methyl hydroxypropyl cellulose ether (having an average of about 1.7 methyl groups and about 0.14 hydroxypropyl groups per anhydroglucose residue unit) were placed in a cylindrical glass reactor on a gas permeable sintered glass plate. The cellulose ether was initially purged of moisture by flowing dry nitrogen through the reactor. Subsequently ammonia gas was passed through the reactor for about 30 minutes. Nitrogen was again passed through the cellulose ether for 2 hours to remove excess ammonia. At this juncture the particulate cellulose ether had been substantially freed of moisture and what moisture remained in the ether was ammoniated.

Thirty percent fuming sulfuric acid was placed in a small glass bubbler and a nitrogen stream purged through the bubbler. Sulfur trioxide gas was thus entrained in the nitrogen stream and the gas mixture was flowed through the dry cellulose ether. This operation was continued for 2 hours after which the cellulose ether was purged with sufficient ammonia to effect neutralization of sulfonic moieties in the cellulose ether.

A sample of the untreated cellulose ether contained less than 3 parts per million sulfur while the treated material contained 190 parts per million by weight of sulfur. This amount of sulfur corresponded to an average sulfonate D.S. of about 0.0011.

Uniform water dispersions of the treated ether were more easily accomplished as evidenced by the facts that a water temperature of at least about 95° C. was required to effect a good dispersion of an untreated ether sample by simple mixing with the heated water, while the treated sample required a water temperature of only about 55° C. to achieve an equally good dispersion. The dissolving rate of the untreated cellulose ether was compared to that of the treated ether by dissolving equal aliquots of the ethers in separate volumes of about 400 milliliters of water. In this test, good dispersion of both the treated and untreated ether samples was achieved by mixing them into water under high agitation. After initial dispersion of the ether solids, the viscosity build-up in the solutions was measured with a Brookfield viscosimeter employing spindle No. 4 operated at 30 r.p.m. The temperature of the ether solutions was 20° C.

The measurements obtained above are reported in the following table according to the time elapsed from initial dispersion of the ether sample in water.

TABLE

| Time, minutes | Brookfield reading [1] | |
|---|---|---|
| | Untreated control | Treated ether |
| 5 | 5 | 14.2 |
| 10 | 12 | 24.0 |
| 20 | 15 | 28.5 |
| 35 | 19.4 | 29.8 |
| 45 | 20.4 | 30.4 |
| 55 | 20.5 | [2] 30.6 |

[1] The values reported are proportional to the actual viscosities of the solutions.
[2] This reading was taken at about the terminal viscosity of the solution which was about 3,900 centipoises at 20° C.

The above data showing the enhanced rate of viscosity build-up, or rate of dissolution of the cellulose ether in water, are most surprising. Prior treatments for enhancing the initial water dispersibility of particulate ethers have generally decreased the solution rate of the ether.

In another operation, 50 grams of a dry sample of the water-soluble cellulose ether used above were placed in a cylindrical glass tumbling reactor. Anhydrous ammonia gas was passed through the reactor for 30 minutes to remove moisture laden air. The ammonia was flushed out with nitrogen gas, and sulfur trioxide gas was passed through the reactor for 20 minutes. The reactor was then rotated end over end for 45 minutes after which the treatment with sulfur trioxide gas was repeated. Ultimately the treatment cycle was carried out 4 times. At the completion of the reaction with sulfur trioxide, the reactor was flushed with nitrogen gas and then with ammonia gas. The product was analyzed for its sulfur content, and on this basis, the sulfonate D.S. was found to be approximately 0.0016.

The above treated product was readily dispersed in water at 25° C. with the formation of an essentially continuous sol with few particulate discontinuities. When dispersed in water under the same conditions, the untreated ethers formed many fish eyes and difficultly soluble lumps.

In addition to the ether treated above, other water-soluble, non-ionic cellulose ethers such as methyl- and ethyl cellulose ethers as well as hydroxy-alkyl ethers including hydroxyethyl- and hydroxypropyl cellulose ethers that dissolve in water can be substituted for the mixed methyl hydroxypropyl cellulose ether utilized above to accomplish comparable results. Water-soluble, as used herein, refers inclusively to ethers soluble in water at an alkaline pH, e.g., pH 10, as well as those soluble in water at pH 7.

What is claimed is:

1. A process which comprises the steps of passing sulfur trioxide vapor through a dry, water-soluble particulate, non-ionic cellulose ether containing less than about 6 percent by weight free moisture, based on the weight of the cellulose ether, said cellulose ether being soluble in water at a pH of 7 to 10, and thereafter passing ammonia gas through the cellulose ether to effect neutralization of sulfonic moieties within the cellulose ether mass to produce a D.S. of sulfonate substitution along the ether chain within the range from about 0.001 to about 0.1 whereby the water dispersibility of the cellulose ether is enhanced.

2. A method as in claim 1 including the additional step, to be carried out prior to passing the sulfur trioxide through the cellulose ether, of passing ammonia gas through the particulate cellulose ether to ammoniate residual moisture in the cellulose ether to be treated with the sulfur trioxide.

3. A method as in claim 1 wherein the temperature of the cellulose ether is maintained within the range from about 10° to about 70° C.

4. A process which comprises the steps of passing sulfur trioxide vapor through a dry, water-soluble particulate methyl cellulose ether having less than about 6 percent by weight free moisture, based on the weight of the ether, and thereafter passing ammonia gas through the cellulose ether to effect neutralization of sulfonic moieties within the cellulose ether mass to produce a D.S. of sulfonate substitution along the ether chain within the range from about 0.001 to about 0.1 whereby the water dispersibility of the cellulose ether is enhanced.

5. A process which comprises the steps of passing sulfur trioxide vapor through a dry, water-soluble particulate methyl hydroxypropyl cellulose ether having less than about 6 percent by weight free moisture based on the weight of the cellulose ether and thereafter passing ammonia gas through the cellulose ether to effect neutralization of sulfonic moieties within the cellulose ether mass to produce a D.S. of sulfonate substitution along the ether chain within the range from about 0.001 to about 0.1 whereby the water dispersibility of the cellulose ether is enhanced.

References Cited

UNITED STATES PATENTS 3,257,380 6/1966 Schweiger _____ 260—209
3,280,102 10/1966 Gordon et al. _____ 260—209

DONALD E. CZAJA, Primary Examiner.

R. W. MULCAHY, Assistant Examiner.